(12) United States Patent
Stephenson

(10) Patent No.: US 6,474,363 B1
(45) Date of Patent: Nov. 5, 2002

(54) COUPLER AND VALVE ASSEMBLY

(76) Inventor: Perry Stephenson, 15 Elmwood Road, Slough Berkshire SL2 5QQ (GB)

( * ) Notice: Subject to any disclaimer, the term of this patent is extended or adjusted under 35 U.S.C. 154(b) by 0 days.

(21) Appl. No.: 09/822,145

(22) Filed: Mar. 30, 2001

(51) Int. Cl.[7] .............................................. F16K 11/22
(52) U.S. Cl. ...................................... 137/883; 137/887
(58) Field of Search ................................. 137/883, 887; 251/315.14

(56) References Cited

U.S. PATENT DOCUMENTS

| | | | | |
|---|---|---|---|---|
| 144,565 A | * | 11/1873 | Roos .......................... | 137/883 |
| 1,099,713 A | * | 6/1914 | Morris ........................ | 137/883 |
| 1,366,591 A | * | 1/1921 | Passano ...................... | 137/883 |
| 1,750,485 A | * | 3/1930 | Muller, Jr. .................. | 137/883 |
| 1,914,736 A | | 6/1933 | Coutu | |
| D199,172 S | | 9/1964 | Drury | |
| 3,501,127 A | | 3/1970 | Freeman | |
| 3,765,647 A | | 10/1973 | Grove et al. | |
| 3,788,344 A | * | 1/1974 | Dyck .......................... | 137/271 |
| 4,177,832 A | | 12/1979 | Price | |
| 4,398,553 A | | 8/1983 | Perrine | |
| 4,523,608 A | * | 6/1985 | Miller ......................... | 137/315 |
| 4,726,399 A | * | 2/1988 | Miller ......................... | 137/884 |
| 4,749,004 A | * | 6/1988 | Peash ......................... | 137/865 |
| 4,887,644 A | * | 12/1989 | Jeromson et al. ........... | 137/876 |
| 4,925,097 A | * | 5/1990 | Corrigan ...................... | 239/73 |
| 5,056,563 A | * | 10/1991 | Glossop ...................... | 137/883 |
| 5,269,347 A | * | 12/1993 | Beasley ...................... | 137/864 |
| 5,533,549 A | * | 7/1996 | Sherman ..................... | 137/557 |
| 5,577,709 A | * | 11/1996 | Gugala et al. ......... | 251/315.14 |
| 5,632,300 A | * | 5/1997 | Isringhausen ............... | 137/269 |
| 6,058,975 A | * | 5/2000 | Hui-Chen .................... | 137/883 |
| 6,148,861 A | * | 11/2000 | Finkeldei et al. ........... | 137/872 |
| 6,199,589 B1 | * | 3/2001 | Hillis ........................ | 137/883 |
| 6,321,782 B1 | * | 11/2001 | Hollister ..................... | 137/557 |

* cited by examiner

*Primary Examiner*—John Fox

(57) ABSTRACT

A coupler and valve assembly for installing hydronic heating systems. The coupler and valve assembly includes a T-shaped tubular member including an elongate cross portion having open ends and a first channel being disposed therethrough, and also including a branch portion being attached to said elongate cross portion and having an open end and a second channel being disposed therethrough and being connected to the first channel; and also includes a valve assembly being disposed in the first channel and including a pair of valve members and a pair of valve stems.

16 Claims, 3 Drawing Sheets

COUPLER AND VALVE ASSEMBLY

BACKGROUND OF THE INVENTION

1. Field of the Invention

The present invention relates to a coupling valve tee and more particularly pertains to a new coupler and valve assembly for installing hydronic heating systems.

2. Description of the Prior Art

The use of a coupling valve tee is known in the prior art. More specifically, a coupling valve tee heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 1,914,736; U.S. Pat. No. 3,501,127; U.S. Pat. No. 4,177,832; U.S. Pat. No. 3,765,647; U.S. Pat. No. Des. 199,172; and U.S. Pat. No. 4,398,553.

While these devices fulfill their respective, particular objectives and requirements, the aforementioned patents do not disclose a new coupler and valve assembly. The inventive device includes a T-shaped tubular member including an elongate cross portion having open ends and a first channel being disposed therethrough, and also including a branch portion being attached to said elongate cross portion and having an open end and a second channel being disposed therethrough and being connected to the first channel; and also includes a valve assembly being disposed in the first channel and including a pair of valve members and a pair of valve stems.

In these respects, the coupler and valve assembly according to the present invention substantially departs from the conventional concepts and designs of the prior art, and in so doing provides an apparatus primarily developed for the purpose of installing hydronic heating systems.

SUMMARY OF THE INVENTION

In view of the foregoing disadvantages inherent in the known types of coupling valve tee now present in the prior art, the present invention provides a new coupler and valve assembly construction wherein the same can be utilized for installing hydronic heating systems.

The general purpose of the present invention, which will be described subsequently in greater detail, is to provide a new coupler and valve assembly which has many of the advantages of the coupling valve tee mentioned heretofore and many novel features that result in a new coupler and valve assembly which is not anticipated, rendered obvious, suggested, or even implied by any of the prior art coupling valve tee, either alone or in any combination thereof.

To attain this, the present invention generally comprises a T-shaped tubular member including an elongate cross portion having open ends and a first channel being disposed therethrough, and also including a branch portion being attached to said elongate cross portion and having an open end and a second channel being disposed therethrough and being connected to the first channel; and also includes a valve assembly being disposed in the first channel and including a pair of valve members and a pair of valve stems.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new coupler and valve assembly which has many of the advantages of the coupling valve tee mentioned heretofore and many novel features that result in a new coupler and valve assembly which is not anticipated, rendered obvious, suggested, or even implied by any of the prior art coupling valve tee, either alone or in any combination thereof.

It is another object of the present invention to provide a new coupler and valve assembly which may be easily and efficiently manufactured and marketed.

It is a further object of the present invention to provide a new coupler and valve assembly which is of a durable and reliable construction.

An even further object of the present invention is to provide a new coupler and valve assembly which is susceptible of a low cost of manufacture with regard to both materials and labor, and which accordingly is then susceptible of low prices of sale to the consuming public, thereby making such coupler and valve assembly economically available to the buying public.

Still yet another object of the present invention is to provide a new coupler and valve assembly which provides in the apparatuses and methods of the prior art some of the advantages thereof, while simultaneously overcoming some of the disadvantages normally associated therewith.

Still another object of the present invention is to provide a new coupler and valve assembly for installing hydronic heating systems.

Yet another object of the present invention is to provide a new coupler and valve assembly which includes a T-shaped tubular member including an elongate cross portion having open ends and a first channel being disposed therethrough, and also including a branch portion being attached to said elongate cross portion and having an open end and a second channel being disposed therethrough and being connected to the first channel; and also includes a valve assembly being disposed in the first channel and including a pair of valve members and a pair of valve stems.

Still yet another object of the present invention is to provide a new coupler and valve assembly that is easy and convenient to use and install quickly.

Even still another object of the present invention is to provide a new coupler and valve assembly that saves the installer time and increases productivity.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
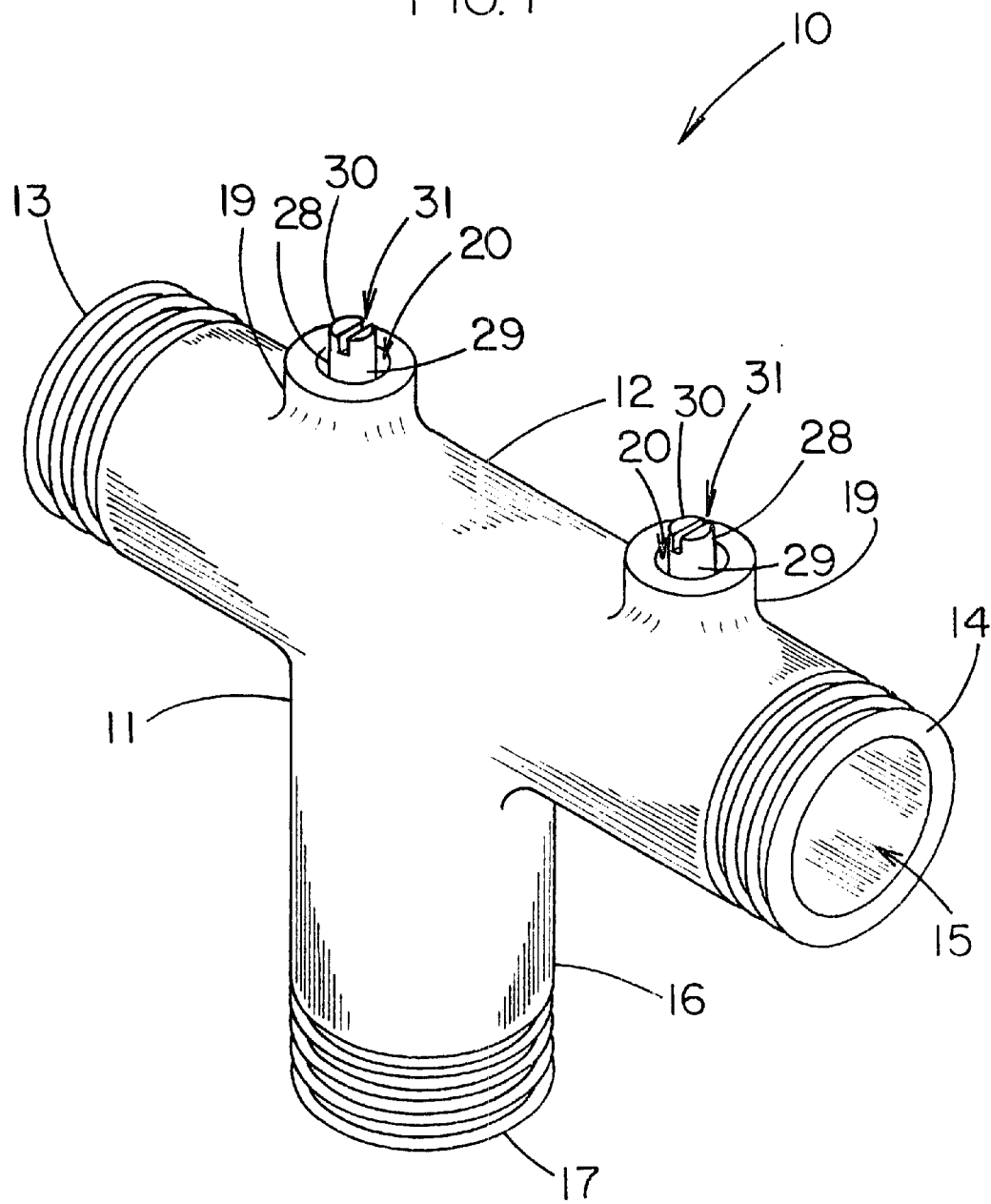
FIG. 1 is a perspective view of a new coupler and valve assembly according to the present invention.
Figure 2:
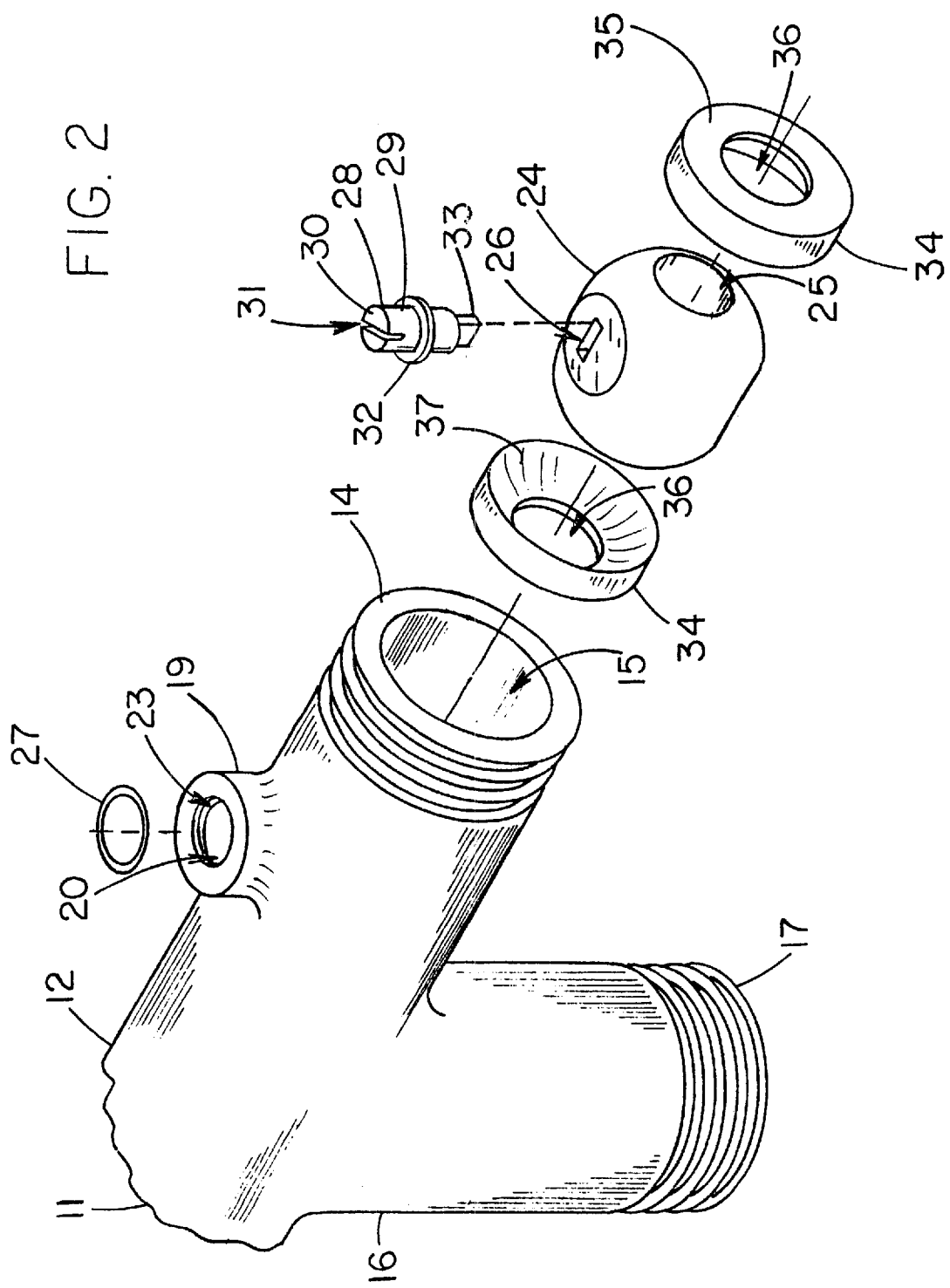
FIG. 2 is a partial exploded perspective view of the present invention.
Figure 3:
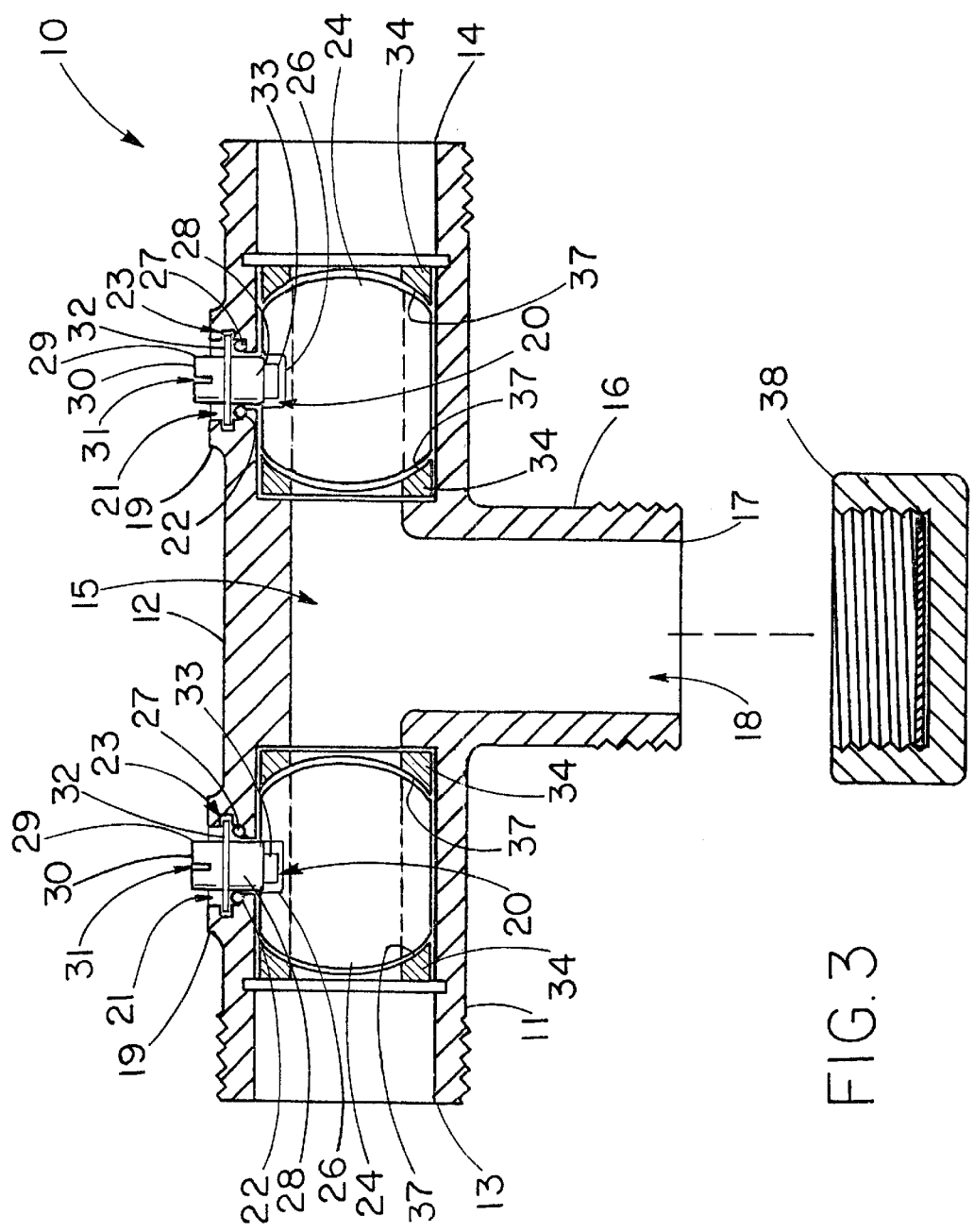
FIG. 3 is a cross-sectional view of the present invention.

With reference now to the drawings, and in particular to FIGS. 1 through 3 thereof, a new coupler and valve assembly embodying the principles and concepts of the present invention and generally designated by the reference numeral 10 will be described.

As best illustrated in FIGS. 1 through 3, the coupler and valve assembly 10 generally comprises a T-shaped tubular member 11 including an elongate cross portion 12 having open ends 13,14 and a first channel 15 being disposed therethrough, and also including a branch portion 16 being integrally attached to the elongate cross portion 12 and having an open end 17 and a second channel 18 being disposed therethrough and being connected to the first channel 14. The T-shaped tubular member 11 further includes boss-like portions 19 being integrally disposed in a side wall of the elongate cross portion 12. Each of the boss-like portions 19 has a bore 20 extending therethrough and into the first channel 14. Each of the bores 20 of the boss-like portions 19 has an annular recessed portion 21 thus forming a ledge 22 therein, and also has an annular groove 23 being disposed in a wall of the annular recessed portion 21. The T-shaped tubular member 11 is threaded about exteriors of the ends 13,14,17 of the elongate cross portion 12 and the branch portion 16.

A valve assembly is conventionally disposed in the first channel 15 and includes a pair of valve members 24 and a pair of valve stems 28. The valve assembly further includes O-ring members 27 being conventionally disposed in the bores 20 of the boss-like portions 19 and being disposed upon the ledges 22 formed in the boss-like portions 19, and also includes seal members 34 being conventionally disposed in the first channel 15. Each of the valve members 34 is generally a round body having a bore 25 extending laterally therethrough. The round body 34 further has a slot 26 being disposed in a top thereof with the valve members 24 being rotatably disposed in the first channel 15 and being in alignment with the bores 20 of the boss-like portions 19. Each of the valve stems 28 includes a cylindrical member 29 having a diametrically-disposed slot 31 in a top end 30 thereof and also has an annular flange 32 extending thereabout and being received in the annular groove 23 in the bore 20 of a respective the boss-like portion 19 with the top end 30 of the cylindrical member 29 being exposed externally of the bore 20. Each of the valve stems 28 also includes an extension member 33 being conventionally extended from a bottom end of the cylindrical member 29 and being received in the slot 26 of a respective round body 24. Each of the seal members 34 is a disk having a wall 35, an opening 36 disposed through the wall 35, and also having an annular beveled depression 37 in a side of the wall 35 and about the opening 36. The seal member 34 includes pairs of the seal members being diametrically-disposed to either side of the valve members 24. The valve members 24 are seated in the annular beveled depressions 37 of the seal members 34 to prevent leakage about the valve members 28.

In use, the user connects the T-shaped tubular member 11 to a fitting 38 and uses a tool to either open or close the valve members 24 as desired.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A coupler and valve assembly comprising:
   a T-shaped tubular member including an elongate cross portion having open ends and a first channel being disposed therethrough, and also including a branch portion being attached to said elongate cross portion and having an open end and a second channel being disposed therethrough and being connected to said first channel;
   a valve assembly being disposed in said first channel and including a pair of valve members and a pair of valve stems;
   wherein said T-shaped tubular member further includes boss portions being disposed in a side wall of said elongate cross portion; each of said loss portions having a bore, and
   wherein each of said bores of said boss portions has an annular recessed portion thus forming a ledge therein, and also has an annular groove disposed in a wall of said annular recessed portion.

2. A coupler and valve assembly as described in claim 1, wherein each of said boss portions of said T-shaped tubular member has a bore extending therethrough and into said first channel.

3. A coupler and valve assembly as described in claim 2, wherein said valve assembly further includes O-ring members being disposed in said bores of said boss portions and being disposed upon said ledges formed in said boss portions, and also includes seal members being disposed in said first channel.

4. A coupler and valve assembly as described in claim 3, wherein each of said valve members is generally a round body having a bore extending laterally therethrough, said round body further having a slot disposed in a top thereof, said valve members being rotatably disposed in said first channel and being in alignment with said bores of said boss portions.

5. A coupler and valve assembly as described in claim 4, wherein each of said valve stems includes a cylindrical member having a diametrically-disposed slot in a top end thereof and also having an annular flange extending thereabout and being received in said annular groove in said bore of a respective said boss portion with said top end of said cylindrical member being exposed externally of said bore, each of said valve stems also including an extension member being extended from a bottom end of said cylindrical member and being received in said slot of a respective said round body.

6. A coupler and valve assembly as described in claim 3, wherein each of said seal members is a disk having a wall, an opening through said wall, and also having an annular beveled depression in a side of said wall and about said opening.

7. A coupler and valve assembly as described in claim 6, wherein said seal member includes pairs of said seal members being diametrically-disposed about said valve members, said valve members being seated in said annular beveled depressions of said seal members to prevent leakage about said valve members.

8. A coupler and valve assembly as described in claim 1, wherein said T-shaped tubular member is threaded about exteriors of said ends of said elongate cross portion and said branch portion.

9. A coupler and valve assembly comprising:
  a T-shaped tubular member including an elongate cross portion having open ends and a first channel being disposed therethrough, and also including a branch portion being attached to said elongate cross portion and having an open end and a second channel being disposed therethrough and being connected to said first channel;
  a valve assembly being disposed in said first channel and including a pair of valve members and a pair of valve stems;
  wherein said T-shaped tubular member further includes boss portions being disposed in a side wall of said elongate cross portion, each of said boss portions having a bore extending therethrough and into said first channel; and
  wherein each of said bores of said boss portions has an annular recessed portion thus forming a ledge therein, and also has an annular groove disposed in a wall of said annular recessed portion.

10. A coupler and valve assembly as described in claim 9, wherein said T-shaped tubular member is threaded about exteriors of said ends of said elongate cross portion and said branch portion.

11. A coupler and valve assembly as described in claim 9, wherein said valve assembly further includes O-ring members being disposed in said bores of said boss portions and being disposed upon said ledges formed in said boss portions, and also includes seal members being disposed in said first channel.

12. A coupler and valve assembly as described in claim 11, wherein each of said valve members is generally a round body having a bore extending laterally therethrough, said round body further having a slot disposed in a top thereof, said valve members being rotatably disposed in said first channel and being in alignment with said bores of said boss portions.

13. A coupler and valve assembly as described in claim 12, wherein each of said valve stems includes a cylindrical member having a diametrically-disposed slot in a top end thereof and also having an annular flange extending thereabout and being received in said annular groove in said bore of a respective said boss portion with said top end of said cylindrical member being exposed externally of said bore, each of said valve stems also including an extension member being extended from a bottom end of said cylindrical member and being received in said slot of a respective said round body.

14. A coupler and valve assembly as described in claim 11, wherein each of said seal members is a disk having a wall, an opening through said wall, and also having an annular beveled depression in a side of said wall and about said opening.

15. A coupler and valve assembly as described in claim 14, wherein said seal member includes pairs of said seal members being diametrically-disposed about said valve members, said valve members being seated in said annular beveled depressions of said seal members to prevent leakage about said valve members.

16. A coupler and valve assembly comprising:
  a T-shaped tubular member including an elongate cross portion having open ends and a first channel being disposed therethrough, and also including a branch portion being attached to said elongate cross portion and having an open end and a second channel being disposed therethrough and being connected to said first channel, said T-shaped tubular member further including boss portions being disposed in a side wall of said elongate cross portion, each of said boss portions having a bore extending therethrough and into said first channel, each of said bores of said boss portions having an annular recessed portion thus forming a ledge therein, and also having an annular groove disposed in a wall of said annular recessed portion, said T-shaped tubular member being threaded about exteriors of said ends of said elongate cross portion and said branch portion; and
  a valve assembly being disposed in said first channel and including a pair of valve members and a pair of valve stems, said valve assembly further including O-ring members being disposed in said bores of said boss portions and being disposed upon said ledges formed in said boss portions, and also including seal members being disposed in said first channel, each of said valve members being generally a round body having a bore extending laterally therethrough, said round body further having a slot disposed in a top thereof, said valve members being rotatably disposed in said first channel and being in alignment with said bores of said boss portions, each of said valve stems including a cylindrical member having a diametrically-disposed slot in a top end thereof and also having an annular flange extending thereabout and being received in said annular groove in said bore of a respective said boss portion with said top end of said cylindrical member being exposed externally of said bore, each of said valve stems also including an extension member being extended from a bottom end of said cylindrical member and being received in said slot of a respective said round body, each of said seal members being a disk having a wall, an opening through said wall, and also having an annular beveled depression in a side of said wall and about said opening, said seal member including pairs of said seal members being diametrically-disposed about said valve members, said valve members being seated in said annular beveled depressions of said seal members to prevent leakage about said valve members.

* * * * *